No. 860,660. PATENTED JULY 23, 1907.
E. HELDMAIER.
RECIPROCATING HYDRAULIC MOTOR.
APPLICATION FILED DEC. 29, 1906.

WITNESSES
W. A. Alexander.
L. L. Mead

INVENTOR
Ernst Heldmaier.
By Fowler & Bryson
ATTORNEYS

UNITED STATES PATENT OFFICE.

ERNST HELDMAIER, OF LUDWIGSBURG, GERMANY.

RECIPROCATING HYDRAULIC MOTOR.

No. 860,660.          Specification of Letters Patent.          Patented July 23, 1907.

Application filed December 29, 1906. Serial No. 350,025.

*To all whom it may concern:*

Be it known that I, ERNST HELDMAIER, foreman, a subject of the German Emperor, residing at Ludwigsburg, (Würtemberg,) Osterholz-Allee 33, Germany, have invented certain new and useful Improvements in Reciprocating Hydraulic Motors; and I do hereby declare the following to be a full, clear, and exact description of the invention, such as will enable others skilled in the art to which it appertains to make and use the same.

This invention relates to that kind of distributing device for water and other liquid pressure engines wherein the water escapes through the hollow piston provided with suitable valves, and through the hollow piston rod, while the admission of water is through a rotary slide at each end of the cylinder.

The invention consists in imparting the necessary turn to the said slides by causing the piston, as it performs its stroke, to engage a suitable cam surface or the like that is situated without the cylinder.

Figure 1:
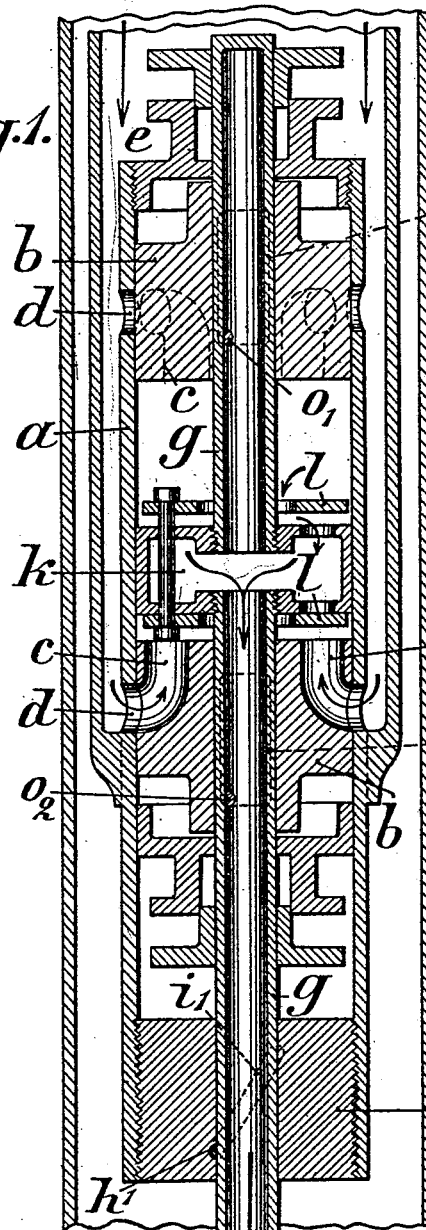
Figure 2:
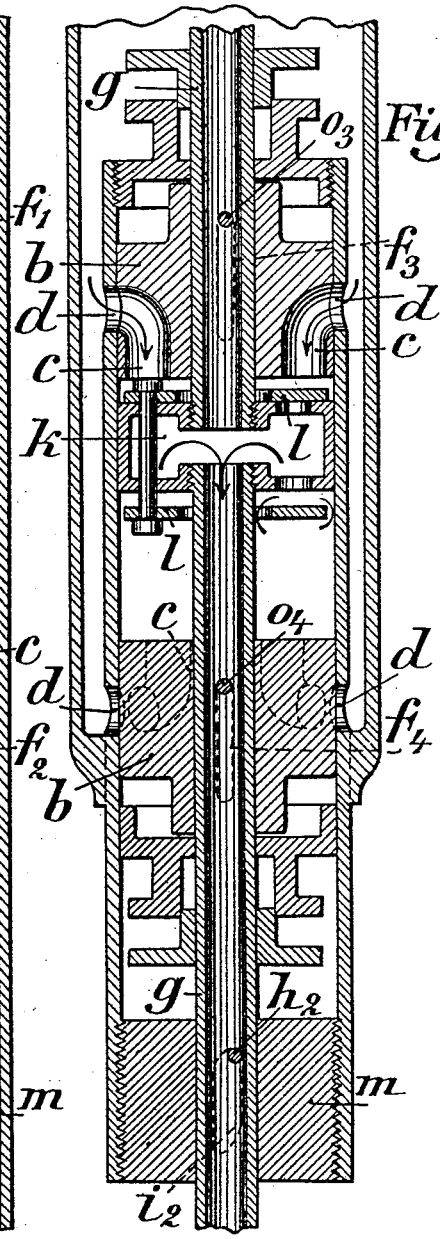

The accompanying drawings illustrate two modifications of the invention, Figures 1 and 2 being longitudinal sections through the cylinders of water pressure engines each provided with the invention.

At each end of the working cylinder $a$ is a rotary slide $b$ through which the piston rod $g$ travels. In each slide there is a number of passage $c$ extending from the inner surface of the cylinder to the inner face of the slide, and in the wall of the cylinder there are corresponding openings $d$, so that when the slide is turned through a certain angle water can flow from the main $e$ into the cylinder as indicated by the arrows, to be cut off when the slide has been turned back again.

In the form shown in Fig. 1 there is a fixed bush $m$ outside the cylinder, through which bush the piston rod slides. Within this bush is a helical groove $i'$ wherein engages a pin $h'$ fixed to the piston rod. Each rotary slide $b$ has a broad longitudinally extending groove $f'$ $f^2$ in which engage pins $o'$ $o^2$ respectively, fixed to the piston rod. As a result of this construction, at each stroke of the piston $k$ the piston rod $g$ is turned by the engagement of pin $h'$ in the groove $i'$, so that shortly before the end of the stroke the pins $o'$ $o^2$ come against the edge of their respective grooves $f'$ $f^2$, whereupon both slides $b$ receive a partial rotation.

Since the slides $b$ are both operated at the same time, the lower one being turned to admit water while the upper one is turned to cut off water, and vice versa, the water enters alternately below and above the piston and the latter is reciprocated. The hollow piston rod is in communication with the hollow piston $k$. The latter has a valve $l$ on each of its faces, which valves are rigidly connected with each other so that the opening of one necessitates the closing of the other. Shortly before the piston arrives at its dead point the advancing valve is closed by contact with the slide $b$ and the rear valve opened. Thus the water which has just propelled the piston can escape, as the latter returns, through the hollow piston and piston rod without having to flow in the direction opposite to that which it previously had, and without passing the slide that is admitting the water. Owing to this peculiar co-action of the hollow piston with the rotary slides, the water does not come to rest, but always remains flowing whereby the concussions which are so injurious to water pressure engines and the pipes connected with them, are avoided and an almost unlimited piston speed can be obtained.

In the modification shown in Fig. 2 the piston rod is turned only at the last portion of its stroke. For this purpose the groove $i^2$ in the bush $m$ is of rhomboidal shape, so that the pin $h^2$ that engages therein is not acted upon to turn the piston rod until it arrives at the oblique end of the groove. In this case the grooves $f^3$, $f^4$, in the slides $b$ are substantially of the same width as the diameter of the pins $o^3$ $o^4$ which engage in them respectively, so that the turning of the piston rod is communicated immediately to the slides $b$.

What I claim as my invention and desire to secure by Letters Patent is:

1. In a reciprocating fluid pressure motor having provision for the supply and exhaust of the motive fluid, the combination with a cylinder, of a piston, a piston rod, rotary valves controlling the supply to said cylinder, said valves being arranged coaxially with the piston and separated therefrom, means for turning said piston rod, and means for transmitting the motion of said rod to said valves.

2. In a reciprocating fluid pressure motor having provision for the supply and exhaust of motive fluid, the combination with a cylinder, of a piston, a piston rod, rotary valves controlling the supply to said cylinder, said valves being arranged coaxially with the piston and separated therefrom, means situated outside of the cylinder for turning said piston rod, and means for transmitting the motion of said rod to said valves.

3. In a reciprocating fluid pressure motor having provision for the supply and exhaust of the motive fluid, the combination with a cylinder, of a piston, a piston rod, rotary valves controlling the supply to said cylinder, said valves being arranged coaxially with the piston and separated therefrom, means for turning said piston, and means operating near the end of the piston stroke for transmitting the motion of said rod to said valves.

4. In a reciprocating fluid pressure motor having provision for the supply and exhaust of the motive fluid, the combination with a cylinder, of a piston, a piston rod, rotary slides traversed by said piston rod and controlling the supply to said cylinder, means for turning the piston rod, and means for transmitting the movement of the piston rod to the rotary slides.

5. In a reciprocating fluid pressure motor having provision for the supply and exhaust of the motive fluid, the combination with a cylinder, of a piston, a piston rod, rotary valves controlling the supply to said cylinder, said valves being arranged coaxially with the piston and separated therefrom, a cam groove for turning said piston rod, and means for transmitting the motion of the said rod to said valves.

6. In a reciprocating fluid pressure motor having provision for the supply and exhaust of the motive fluid, the combination with a cylinder, of a piston, a piston rod, rotary slides controlling the supply to said cylinder, means for turning said piston rod, projections on said piston rod, and slots in the rotary slides engaged by said projections.

7. In a reciprocating fluid pressure motor having provision for the supply and exhaust of the motive fluid, the combination with a cylinder, of a piston, a piston rod, rotary slides traversed by said piston rod and controlling the supply to said cylinder, a cam groove situated outside of the cylinder for turning the piston rod, and means for transmitting the motion of the piston rod to the rotary slides toward the end of the piston stroke.

In testimony whereof, I have hereunto set my hand and affixed my seal, in the presence of the two subscribing witnesses.

ERNST HELDMAIER. [L. S.]

Witnesses:
 EUGEN WEINMAR,
 THEOD. HETZEL.